United States Patent
Pauley (10) Patent No.: US 10,477,858 B2
(45) Date of Patent: Nov. 19, 2019

(54) HUNTING DEVICE WITH PIVOTING FAN OR DECOY SUPPORT AND GUN MOUNT

(71) Applicant: Michael Pauley, Buchanan, VA (US)

(72) Inventor: Michael Pauley, Buchanan, VA (US)

( * ) Notice: Subject to any disclaimer, the term of this patent is extended or adjusted under 35 U.S.C. 154(b) by 0 days.

(21) Appl. No.: 14/971,789

(22) Filed: Dec. 16, 2015

(65) Prior Publication Data

US 2017/0176125 A1    Jun. 22, 2017

(51) Int. Cl.
*A01M 31/06* (2006.01)
*F41A 23/04* (2006.01)

(52) U.S. Cl.
CPC .............. *A01M 31/06* (2013.01); *F41A 23/04* (2013.01)

(58) Field of Classification Search
CPC .......... F41A 23/02; F41A 23/04; F41A 23/06; F41A 23/08; F41A 23/10; F41A 23/12; F41A 23/14; F41A 35/00; A01M 31/06; F41C 27/00
USPC ............................................................ 42/90
See application file for complete search history.

(56) References Cited

U.S. PATENT DOCUMENTS

| | | | | |
|---|---|---|---|---|
| 3,850,401 A | * | 11/1974 | Snediker ................ | A47B 97/02 248/292.13 |
| 4,590,699 A | * | 5/1986 | Nicks ..................... | A01M 31/06 43/2 |
| 4,817,579 A | * | 4/1989 | Mathias ................. | F41B 5/1496 124/23.1 |
| 5,127,180 A | * | 7/1992 | Norton ................... | A01M 31/00 135/901 |
| 5,214,872 A | * | 6/1993 | Buyalos, Jr. .......... | A01M 31/00 135/75 |
| 5,235,772 A | * | 8/1993 | Mendick, Jr. .......... | A01M 31/00 124/23.1 |
| 5,808,227 A | * | 9/1998 | Amos ...................... | F41A 23/06 42/94 |
| 5,944,041 A | * | 8/1999 | Kitchens ................ | E04H 15/001 124/23.1 |
| 6,272,785 B1 | * | 8/2001 | Mika ........................ | F41A 23/14 42/94 |
| 6,296,005 B1 | * | 10/2001 | Williams ............ | A01M 31/025 135/901 |

(Continued)

OTHER PUBLICATIONS

NPL: https://web.archive.org/web/20150323204415/http://www.primos.com/products/decoys/chicken-stick/ Mar. 23, 2015.*

(Continued)

*Primary Examiner* — John Cooper
(74) *Attorney, Agent, or Firm* — Quarles & Brady LLP (57) ABSTRACT

The present invention is a hunting device that may be used to hunt wild game, such as turkeys. The hunting device comprises a handle, a fan or decoy support for securely mounting a fan or decoy and a gun mount for receiving a gun. The fan or decoy support may be connected to the handle while the gun mount is preferably mounted to the handle via a movable joint. The hunting device allows the handle to move the fan or decoy and allows the gun to be moved relative and/or independent of the fan or decoy movement. The hunting device also allows the gun to be moved via a movable joint. This configuration gives the hunter greater control and freedom over the movement of the fan or decoy while maintaining control and movement of the gun.

3 Claims, 7 Drawing Sheets

(56) References Cited

U.S. PATENT DOCUMENTS

| | | | | |
|---|---|---|---|---|
| 6,487,810 | B1* | 12/2002 | Loughman | A01M 31/06 43/2 |
| 6,543,175 | B1* | 4/2003 | Tucker | A01M 31/00 42/94 |
| 6,775,943 | B2* | 8/2004 | Loughman | A01M 31/06 43/2 |
| 6,920,713 | B1* | 7/2005 | Love | F41A 23/04 42/90 |
| 7,275,532 | B2* | 10/2007 | Niemackl | F41B 5/14 124/23.1 |
| D560,746 | S* | 1/2008 | Bulger | D22/125 |
| 7,565,762 | B2* | 7/2009 | Lackey | F41A 23/06 211/64 |
| 7,784,213 | B1* | 8/2010 | Primos | A01M 31/06 43/2 |
| 7,828,003 | B2* | 11/2010 | Montecucco | A01M 31/025 135/117 |
| 7,958,878 | B2* | 6/2011 | Hoffmann | A01M 31/025 124/25 |
| 8,051,864 | B1* | 11/2011 | Gabrielson | A01M 31/025 135/16 |
| 8,083,198 | B2* | 12/2011 | Stabler | F16M 11/16 211/184 |
| 8,549,786 | B1* | 10/2013 | Griffith | F41A 23/16 42/94 |
| 8,627,592 | B2* | 1/2014 | Sloop | A01M 31/06 43/2 |
| 8,701,332 | B1* | 4/2014 | Chavez | A01M 31/06 43/2 |
| 8,720,428 | B2* | 5/2014 | Jantzen | E04H 15/001 124/86 |
| 8,813,407 | B1* | 8/2014 | Sargent | F41A 23/16 42/94 |
| 8,894,024 | B2* | 11/2014 | Deros | F16M 11/041 248/124.1 |
| 9,016,298 | B2* | 4/2015 | Mausen | A01M 31/025 135/901 |
| 9,345,240 | B1* | 5/2016 | Cain, Jr. | A01M 31/06 |
| 2003/0106253 | A1* | 6/2003 | Loughman | A01M 31/06 43/2 |
| 2008/0216381 | A1* | 9/2008 | Wyant | A01M 31/06 43/2 |
| 2012/0042561 | A1* | 2/2012 | Bain | A01M 31/06 43/3 |
| 2012/0180371 | A1* | 7/2012 | Roe | A01M 31/06 43/3 |
| 2012/0273631 | A1* | 11/2012 | Deros | F16M 11/041 248/122.1 |
| 2014/0130396 | A1* | 5/2014 | Yaron | A01M 31/06 43/2 |

OTHER PUBLICATIONS

Flambeau Outdoors™ product page of a Feather Flex® Turkey Hen from flambeauoutdoors.com website [online] [retrieved on Oct. 13, 2015], 1 page. Retrieved from <URL: http://www.flambeauoutdoors.com/en/hunting/site/details/SF008455>.

Flambeau Outdoors™ product page of Feather Flex® Jake Decoy Individual Bulk Packaging from flambeauoutdoors.com website [online] [retrieved on Oct. 13, 2015], 1 page. Retrieved from <URL: http://www.flambeauoutdoors.com/en/hunting/site/details/SF008461>.

Flextone Game Calls product page for Funky-Chicken™ Decoy from flextonegamecalls.com website [online] [retrieved on Oct. 13, 2015], 1 page. Retrieved from <URL: http://www.flextonegamecalls.com/products/decoys/funky-chicken.html>.

Flextone Game Calls product page for Thunder Chicken™ 1/4 Strut Decoy from flextonegamecalls.com website [online] [retrieved on Oct. 13, 2015], 1 page. Retrieved from <URL: http://www.flextonegamecalls.com/products/decoys/thunder-chickentm-1-4-strut-decoy.html>.

Hunters Specialties™ product page for "The Snoods" Turkey Decoys from hunterspec.com website [online] [retrieved on Oct. 13, 2015], 1 page. Retrieved from <URL: http://www.hunterspec.com/content/snoods-turkey-decoys>.

Primos Hunting product page for turkey decoys from primos.com website [online] [retrieved on Oct. 13, 2015], 1 page. Retrieved from <URL: http://www.primos.com/products/decoys>.

Montana Decoy Co. product page for hunting decoys from montanadecoy.com website [online] [retrieved on Oct. 13, 2015], 2 pages. Retrieved from <URL: http://www.montanadecoy.com/hunting-decoys>.

Mojo Outdoors™ product pages for turkey decoys from mojooutdoors.com website [online] [retrieved on Oct. 13, 2015], 2 pages. Retrieved from <URL: http://www.mojooutdoors.com/index.php/vendor-products-menu-item/category/64-decoys>.

* cited by examiner

HUNTING DEVICE WITH PIVOTING FAN OR DECOY SUPPORT AND GUN MOUNT

FIELD OF THE INVENTION

The present invention generally relates to the field of hunting and more particularly to a hunting device with a pivoting fan or decoy support and gun mount. The hunting device allows a hunter to attract game (such as a turkey) with a fan or decoy while being concealed by the fan or decoy and to pivot a fan or decoy mounted to the gun via the hunting device and a gun placed in a gun mount of the hunting device.

SUMMARY OF THE INVENTION

The present invention is a hunting device that may be used to hunt game, such as turkeys. The hunting device allows a hunter to support a gun and use a fan, such as a turkey fan, or a decoy to attract game and to hide the hunter. The hunting device preferably allows a fan to be repeatedly opened and/or closed, the hunting device (and advantageously the fan or decoy) to be moved, tilted, rotated and controlled by corresponding movements of a handle. The hunting device may include a gun mount for placing a gun in the mount. The fan or decoy are mounted to the gun and are able to be pivoted and turned without moving the gun barrel position and/or the gun barrel may be pivoted and turned without moving the fan or decoy. These actions or movements may occur singularly, in any combination or all at the same time as desired by the hunter.

The hunting device may comprise a handle that permits the hunter to hold the hunting device with one hand. The handle is preferably light weight, yet strong enough to withstand the recoil of the gun. The handle may be made of any material, but is preferably made of a hard plastic. The handle may have a smooth bottom surface to allow the handle to be slid along the ground during hunting. The handle may be used to move the entire hunting device.

The hunting device may also comprise a fan or decoy support connected to the handle. The fan or decoy support may have a receptacle for receiving and holding the central pivot point and/or bottom of a fan or decoy adjacent and/or above a gun mount. The fan or decoy support may hold and support the fan or decoy to the hunting device. The fan or decoy support may also be able to control some of the movements of the fan or decoy. As non-limiting examples, the fan or decoy support may allow fans or decoys to be exchanged, a fan to be spread, collapsed, tilted, moved back-and-forth between a spread and a closed position and/or locked into place. The fan or decoy support may comprise an adjustable fan or decoy support base that is adjustable between an extended position for spreading the fan or decoy and a contracted position for collapsing the fan or decoy. Parts of the fan or decoy support may also be shaped like a head and/or a neck of the game being hunted. The handle may be moved vertically, horizontally, tilted up or down and/or rotated side to side causing a corresponding movement in the fan or decoy support and the attached fan or decoy.

The hunting device may also comprise a pivoting gun mount mounted over and/or adjacent to the handle. A gun stock or a gun barrel may be rested or mounted in the gun mount. The gun mount may be of any shape, but is preferably shaped like a "V," "U," squashed "U," (referred generally as a half pipe) and may have zero or one or more clamps to firmly hold the gun stock or the gun barrel in the gun mount. The pivoting ability of the gun mount allows the gun to be tilted up or down (vertical movement) and/or swung side-to-side (horizontal movement) at the same time as the fan or decoy is either being held still or is being moved, tilted and/or rotated as the handle is being moved, tilted and/or rotated. The handle may be moved vertically, horizontally, and/or rotated causing a corresponding movement to the pivot point of the gun mount. Thus, the fan or decoy may be moved through the use of the handle and fan or decoy support while the gun may be simultaneously moved through the use of the pivoting gun mount.

The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Figure 1:
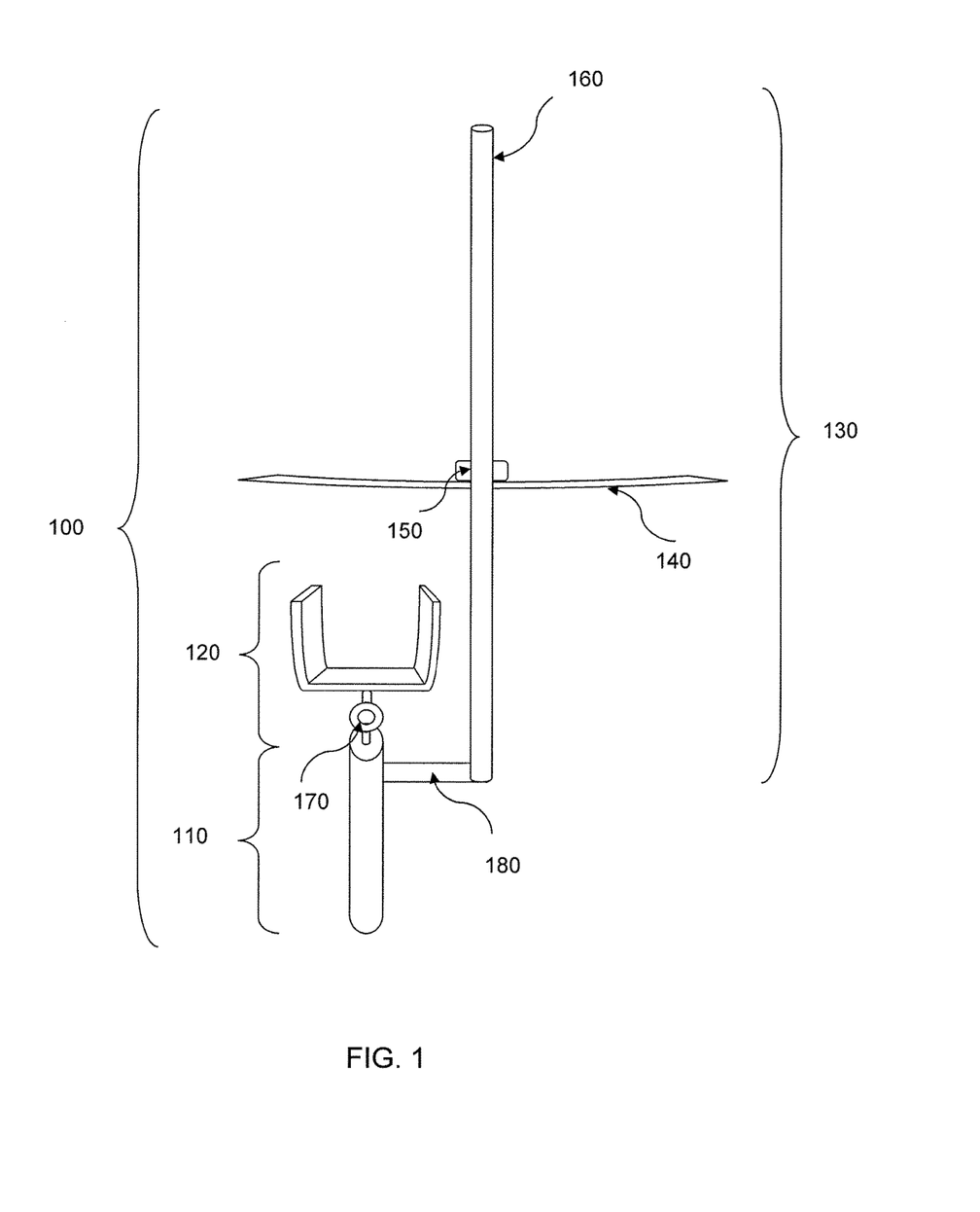
FIG. 1 is an illustration of a hunting device that comprises a handle, a fan or decoy support and gun mount with a movable joint.

FIG. 1 is an illustration of a hunting device 100 that may be used to practice the present invention. The hunting device 100 may be used to hunt any wild game and/or big game desired by the hunter. As non-limiting examples, the present invention may be used to hunt turkeys, quails, ducks, gooses or any other wild game. The hunting device 100 is preferably light weight, yet strong enough to withstand the recoil of a gun 700 (illustrated in FIG. 7) and the rigors of hunting and hiking. The hunting device 100 may be made of any durable material, but is preferably made of plastic, wood, graphite, fiberglass, metal (preferably a light weight metal) or a composite of materials. The hunting device 100 may include a handle 110 for controlling the movement of the hunting device 100, a gun mount 120 for supporting and controlling the movements of a gun 700 and a fan or decoy support 130 for mounting and controlling the movements of a fan or decoy 400 (shown in FIGS. 4-7). The components of the hunting device 100 work together to allow the hunter to use the fan or decoy 400 to attract wild game and to hide the hunter while the gun mount 120, via a movable joint 170, also allows the gun 700 to be tilted up or down or swung left or right.

Handle

The hunting device 100 may comprise a handle 110 that permits the hunter to hold the hunting device 100 with one hand (typically the left hand for a right handed shooter). The handle 110 may be generally an elongated cylinder, preferably with finger grips, a top surface and a smooth bottom surface. The handle 110 is of a suitable size and dimensions to be comfortably held in one hand. The handle 110 preferably has a smooth bottom to allow the handle 110 to be slid along the ground during hunting or may have legs (not shown) to create a stationary stand for resting the gun 700.

The handle 110 may be used to control the overall movement of the hunting device 100 and specifically the movements of the fan or decoy 400 mounted to the fan or decoy support 130. For example, if the handle 110 is tilted up or down, rotated left or right or moved from one location to another, the fan or decoy 400 and the fan or decoy support 130 will make corresponding movements. Thus, the handle 110 allows the hunter to easily move the fan or decoy 400 with one hand in such a manner as to simultaneously attract wild game while hiding the hunter behind the fan or decoy 400.

The handle 110 may also be used to support and position the gun mount 120. In preferred embodiments, a pivot point, possibly created by the moveable joint 170, for the gun mount 120 is adjacent and/or above the handle 110. The fan or decoy support 130 may be attached to the handle 110 in any desired manner. The gun mount 120 is preferably attached to the upper surface of the handle via the movable joint 170.

Fan or Decoy Support

The hunting device 100 may also comprise a fan support 130 or a decoy support 130. The fan or decoy support 130 may be connected to the handle 110 using any desired method, but is preferably connected, as a non-limiting example, using a receptacle 180 that allows the fan or decoy support 130 to be easily connected or disconnected from the handle 110. A support leg 160 of the fan or decoy support 130 may be inserted into the receptacle 180 to connect the fan or decoy support 130 to the handle 110. In some embodiments, the fan or decoy support 130 may be easily connected and disconnected from the receptacle 180. When the fan or decoy support 130 is discounted from the handle 110, the fan or decoy support 130 gain completely independent movement (possibly with a fan or decoy 400 still attached) from the handle 110 and the hunting device 100. The receptacle 180 may, as a non-limiting example, be configured to receive and retain a base of the support leg 160 and to release the base of the support leg 160 as desired by the user.

The following embodiments that illustrate a fan 400 may use a decoy 400 and embodiments that illustrate a decoy 400 may use a fan 400. The fan or decoy support 130 may support, hold and control the movement of the fan or decoy 400. As non-limiting examples, the fan or decoy support 130 may allow the fan or decoy 400 to be exchanged, spread, collapsed, moved back and forth between a spread and a collapsed position and/or locked into place. The fan or decoy support 130 may have a receptacle 150 for receiving and holding a central pivot point and/or bottom of the fan or decoy 400 above or adjacent the gun mount 120. The fan or decoy 400 may be opened or extended manually by hand while the bottom of the fan or decoy 400 is retained in the receptacle 150. In other embodiments, the motion may be automated through the inclusion of electronic components to simulate the manual movements of the fan or decoy 400.

Figure 2:
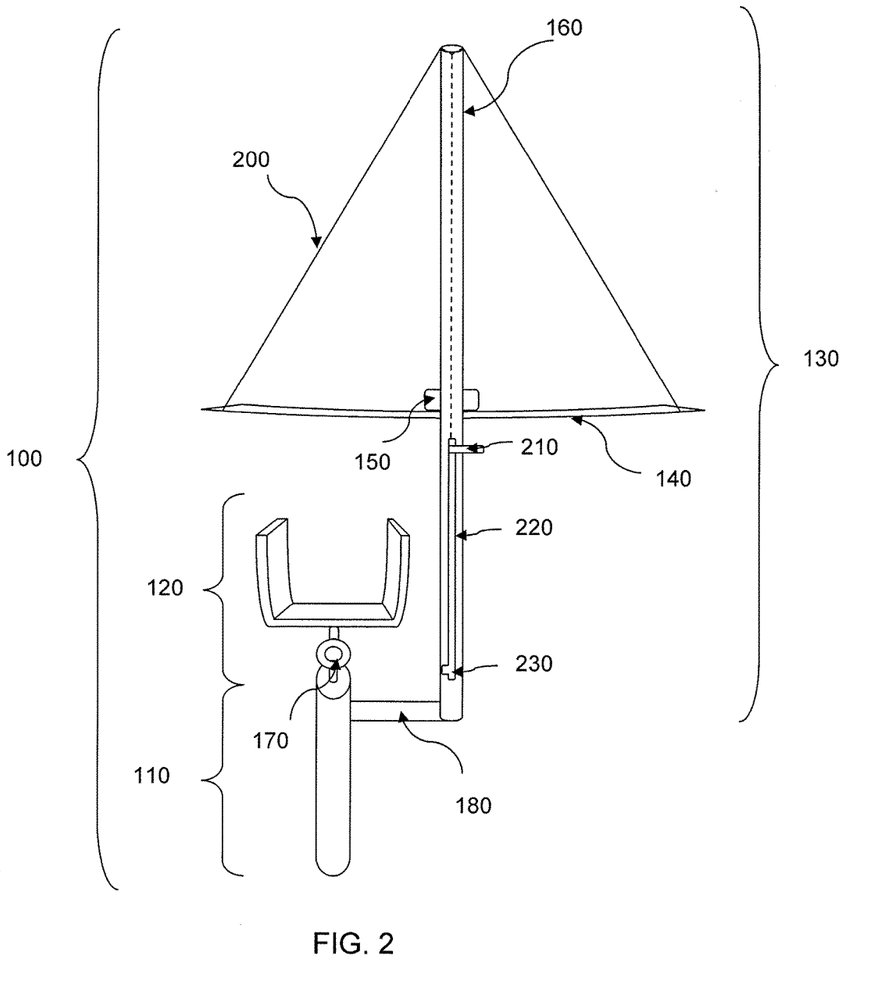
FIG. 2 is an illustration of the hunting device with a non-limiting example of a mechanical device for opening the fan or decoy support to spread a fan or decoy and closing the fan or decoy support to collapse the fan or decoy. The fan or decoy support is illustrated in the open position.
Figure 3:
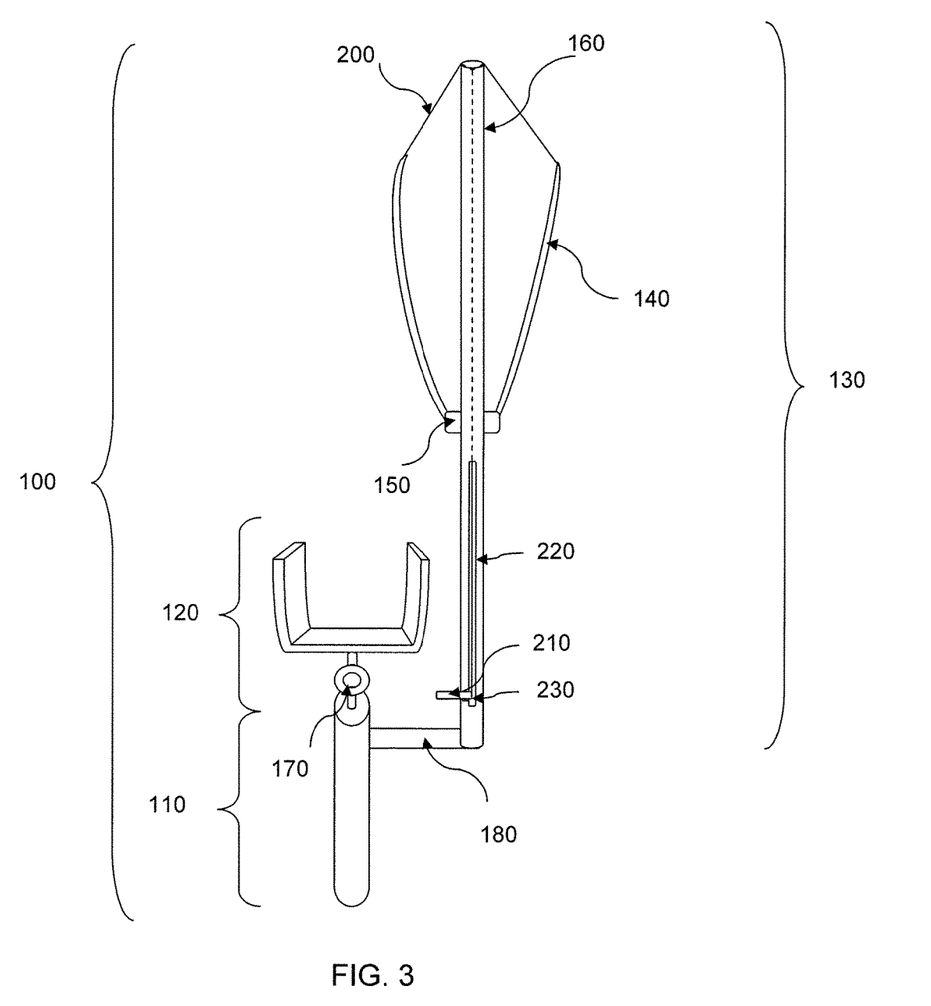
FIG. 3 is an illustration of the hunting device with a non-limiting example of a mechanical device for opening the fan or decoy support to spread the fan or decoy and closing the fan or decoy support to collapse the fan or decoy. The fan or decoy support is illustrated in the closed position.
Figure 4:
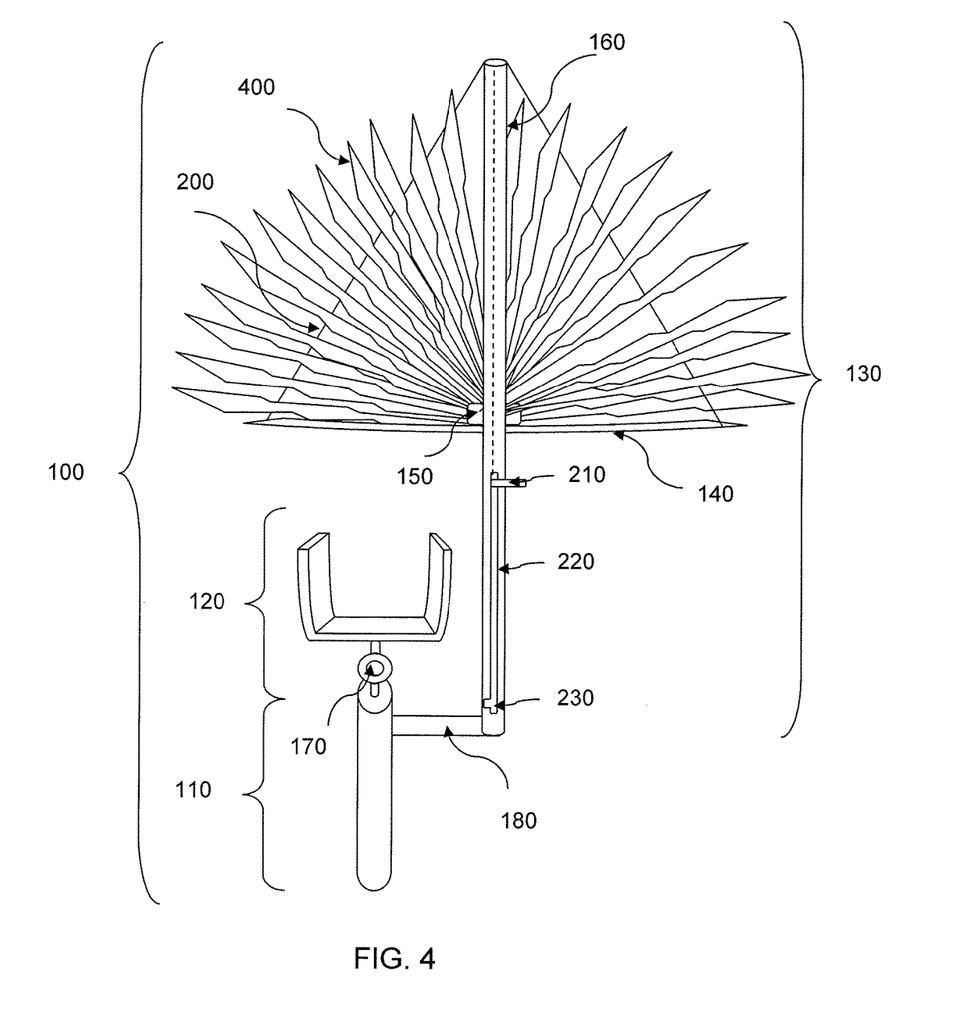
FIG. 4 is an illustration of the hunting device with a fan or decoy in the spread or open position.
Figure 5:
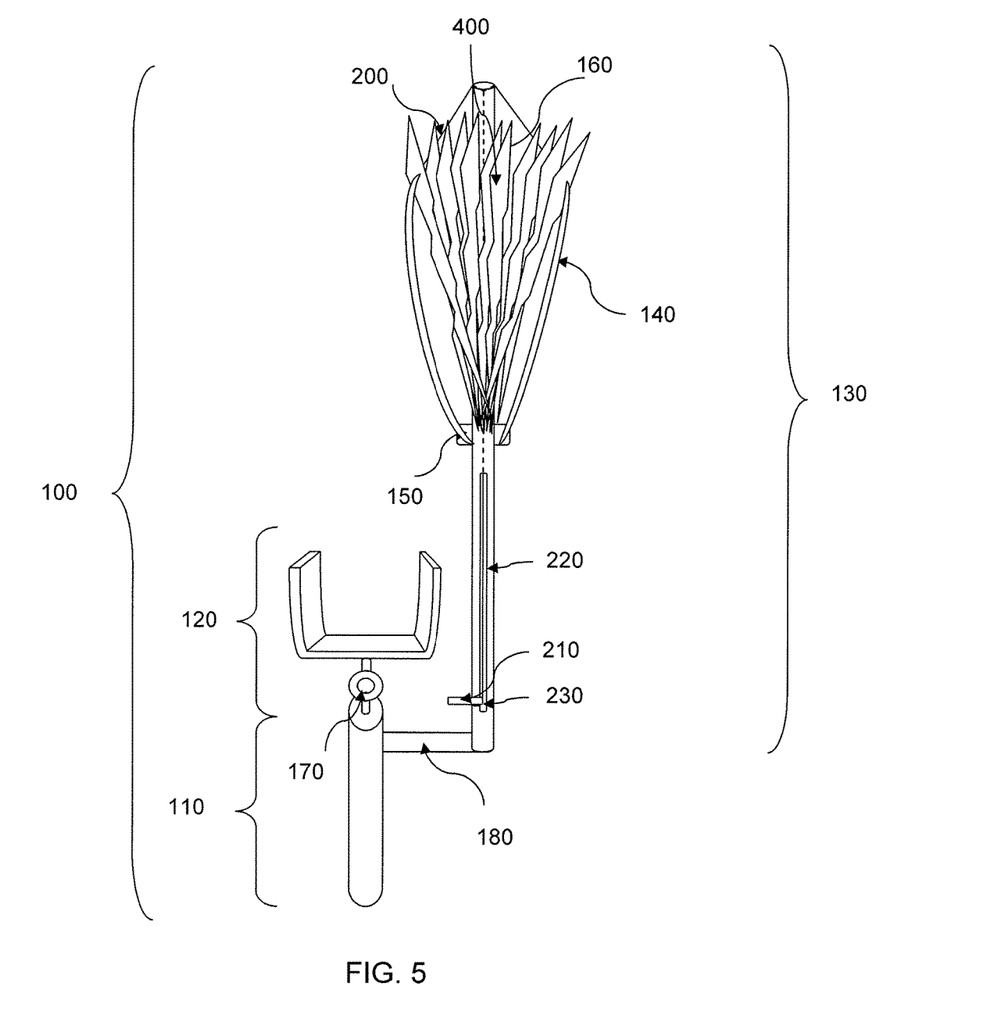
FIG. 5 is an illustration of the hunting device with the fan or decoy in the collapsed or closed position.

In other embodiments, the fan or decoy support 130 may comprise an attachment arm 140 that may be adjustable between an extended position for spreading the fan or decoy 400 (shown in FIGS. 1, 2, 4, 6 and 7) and a contracted position for collapsing the fan or decoy 400 (shown in FIGS. 3 and 5). The attachment arm 140 may be used to hold and control the fan or decoy 400 by connecting the first and last feathers (or parts of the fan or decoy close to the first and last feathers) of the fan or decoy 400 to the attachment arm 140. In these embodiments, the attachment arm 140 may be adjustable so as to be in an open or closed position (or somewhere between). When the attachment arm 140 is opened, the fan or decoy 400 is also spread open and when the attachment arm 140 is closed the fan or decoy 400 is collapsed. In preferred embodiments, the attachment arm 140 may be locked in the open position and/or closed position while also allowing the fan or decoy 400 to be moved back and forth between the open (spread) and closed (collapsed) position to imitate the movement of the fan of real wild game. The movement of the fan or decoy 400 made possible by the fan or decoy support 130 has the advantage of simulating the movement of wild game and thus may be used by the hunter to attract the wild game.

FIGS. 2-5 illustrate one non-limiting method of opening and closing a fan or decoy 400 attached to the fan or decoy support 130 via the receptacle 150 or the attachment arm 140. A line 200, made of, as non-limiting examples, string or wire, may be connected to the ends of attachment arm 140. The line 200 may run up from the ends of the attachment arm 140, down the support leg 160 and then be attached to a lever 210. FIGS. 2 and 4 illustrate how the attachment arm 140 and fan or decoy 400 are open or in the spread position when the lever 210 is at the top of a slot 220 in the support leg 160. FIGS. 3 and 5 illustrate how the attachment arm 140 is moved to a closed position (collapsing the fan or decoy) when the lever 210 is slid down the slot 220 and positioned in a lock notch 230.

The support leg 160 of the fan or decoy support 130 may also be shaped or colored to look like a head and/or neck of wild game. The fan or decoy 400 may be from a real wild game fan (such as a turkey fan) or be a simulated wild game fan. The fan or decoy 400 may have a portion that may be seen through (a central patch or area in the center of the fan or decoy) by the hunter to allow the hunter to watch the wild game through the fan or decoy 400 as the hunter hunts the wild game. The handle 110 may be moved vertically, horizontally, tilted up or down and/or rotated side to side causing a corresponding movement in the fan or decoy support 130 and the attached fan or decoy 400. Any type of fan or decoy 400 may be used with the hunting device 100. As non-limiting examples, the decoy may be a two dimensional or a three dimensional representation of any desired decoy animal. The three dimensional representation of the decoy animal does not have to include all of the decoy animal, but may, as a non-limiting example, include just a three dimensional representation of a neck and a head of the decoy animal. The desired decoy animal is preferably an animal that will attract and not spook or scare the game being hunted. As a non-limit example, it may be advantageous when hunting turkeys to use a two or three dimensional decoy animal representing a turkey. The decoy animal may be manufactured and/or sold by anybody, but as non-limiting examples the decoy animal may be manufactured and/or sold by Montana Decoy, Inc. or Cabela's Inc.

In another embodiment, the fan or decoy support 130 may include an attachment mechanism configured to connect the fan or decoy support 130 to a barrel or stock of a gun 700 or a riser of a bow. In this embodiment, the support leg 160 of the fan or decoy support 130 may be rotated in the receptacle 180 or the receptacle 180 may be rotated permitting the support leg 160 to be adjacent and parallel with the barrel or stock of the gun 700. The attachment mechanism may then be used to attach the fan or decoy support 130 to the barrel or stock of the gun 700. The attachment mechanism may use any desired means of connecting the fan or decoy support 130 with the barrel or stock of the gun 700. As a non-limiting example, the attachment mechanism may be a velcro strip or a leather strap to encircle the fan or decoy support 130 and the barrel or stock of the gun 700, clamps, clasps, or any other desired mechanism to connect the fan or decoy support 130 with the barrel or stock of the gun 700.

Gun Mount or Bow Mount

The hunting device 100 may also comprise a pivoting or movable gun mount 120 mounted over and/or adjacent the handle 110. A gun 700 (preferably the gun stock or the gun barrel) may be mounted in the gun mount 120. The gun mount 120 may have any desired shape for receiving the gun 700, but is preferably shaped like a halfpipe. For purposes of this specification and claims, the halfpipe does not have to be a perfect semicircle and instead may have, as non-limiting examples, a "V" shape, a "U" shape or a "U" shape with a flatten bottom as illustrated in FIGS. 1-7. The inside of the gun mount 120 is preferably lined with a soft material, such as rubber, that will not damage or scratch the gun stock or the gun barrel. The gun mount 120 may include a mounting means to connect the gun 700 and/or gun barrel to the gun mount 120 of the hunting device 100. The mounting means may include one or more velcro strips, leather straps, clips and/or clamps that retain and secure the gun 700 to the gun mount 120.

Figure 6:
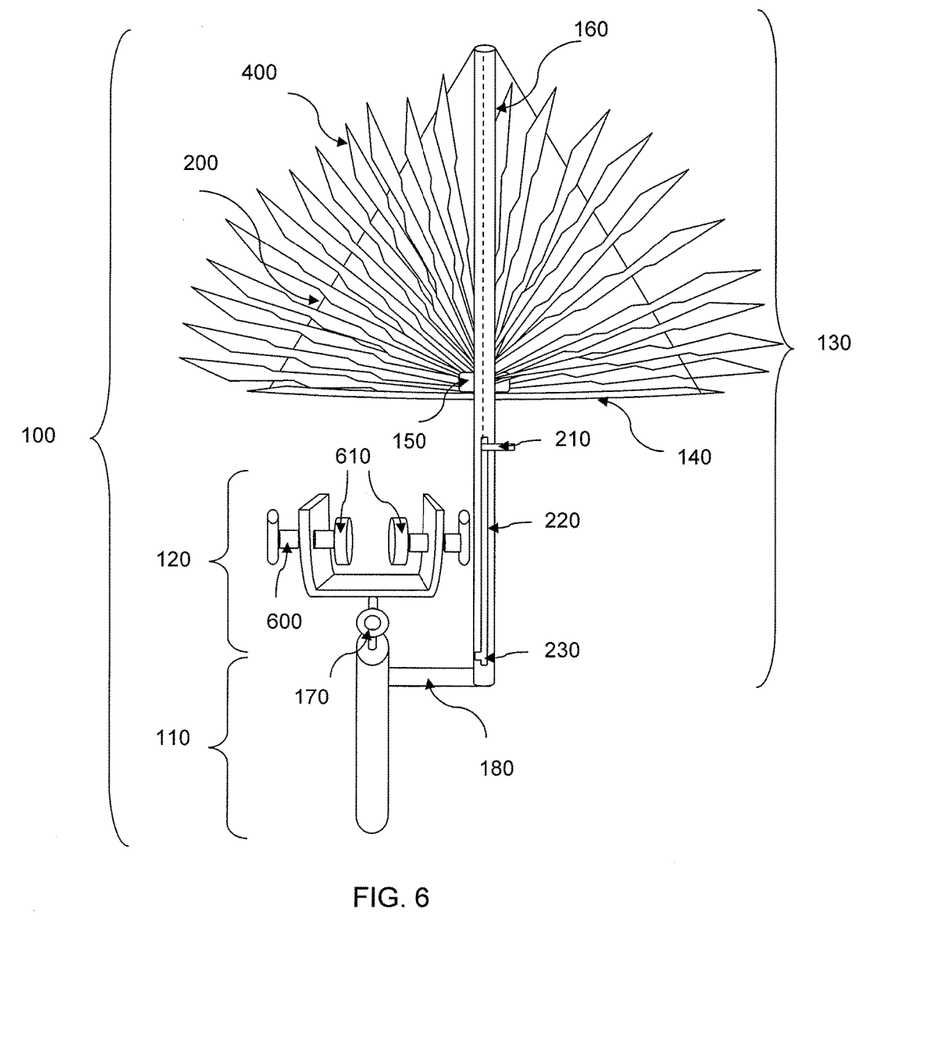
FIG. 6 is an illustration of the hunting device with the fan or decoy in the spread or open position and the gun mount comprising two clamps for fixedly connecting a gun to the gun mount.
Figure 7:
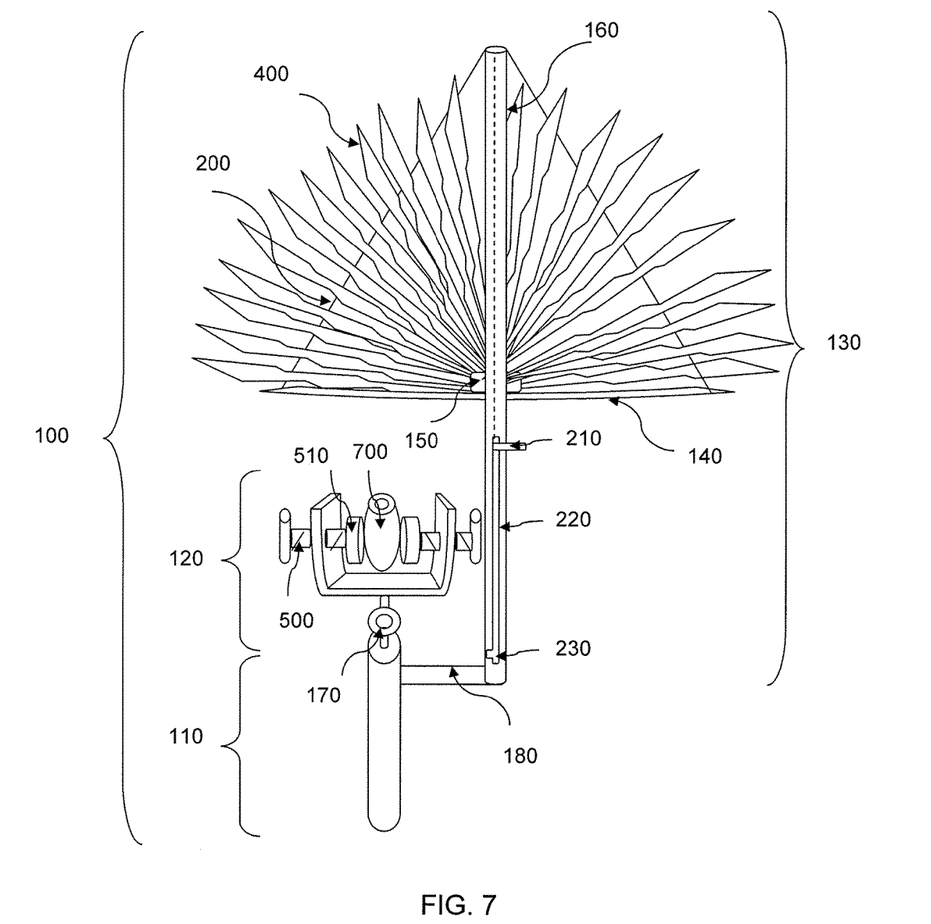
FIG. 7 is an illustration of the hunting device with the fan or decoy in the spread or open position and the gun connected to the gun mount by two opposing clamps.

FIGS. 6 and 7 illustrate a preferred embodiment of using two clamps 600 (although any number of clamps 600, including zero, may be used) to firmly hold the gun 700 in the gun mount 120. The gun 700 may be supported and/or attached to the hunting device 100 by placing or resting the gun 700 in the gun mount 120 and optionally by engaging one or more clamps 600 to firmly hold the gun 700 in the gun mount 120. Each clamp 600 may have a gun contact surface 610 for making contact with the gun 700. The gun contact surface 610 is preferably made of rubber or another material that will not scratch or damage the gun 700 when in contact with the gun 700. The gun mount 120 may have one or more clamps 600 that extend through the side walls of the gun mount 120 to firmly clamp and hold the gun 700 (specifically the gun stock or the gun barrel) to the gun mount 120. Any method may be used to press the clamps 600 against the gun 700 to retain the gun 700 in the gun mount 120. As a non-limiting example, the clamps 600 may have threads that allow the clamps to be screwed through the sidewalls of the gun mount 120 so that the gun contact surface 610 for each clamp firmly presses against the gun 700. The clamps 600 are preferably in pairs that are in alignment and face each other and press against the gun 700 from opposite directions.

The gun mount 120 may include a movable joint 170 that is connected to the handle 110. Any type of movable joint 170 may be used in the present invention. As non-limiting examples, the movable joint 170 may be a knuckle, universal, hinge, ball or some combination thereof. The movable joint 170 preferably gives one or more degrees of freedom of movement between the gun mount 120 and the handle 110. In preferred embodiments, the movable joint 170 provides a pivot point adjacent and/or above the handle 110 that allows a gun 700 positioned in the gun mount 120 to be tilted up or down and/or swung side-to-side.

In preferred embodiments, the gun mount 120 is able to pivot on a pivot point directly above the handle 110. In these embodiments, the gun mount 120 may be tilted up or down in relation to the handle 110 to allow the gun 700 in the gun mount 120 to change its aim point in the vertical direction. The gun mount 120 may also be swung left or right in relation to the handle 110 on the pivot point to allow the gun 700 in the gun mount 120 to change its aim point in the horizontal direction. Thus, the pivoting ability of the gun mount 120 allows the gun 700 to be tilted up or down (vertical movement) and/or swung side-to-side (horizontal movement) at the same time as the fan or decoy 400 is either being held still or the fan or decoy 400 is being moved, tilted and/or rotated as the handle 110 is being moved, tilted and/or rotated. Thus, the gun mount 120 (and the gun 700) is not limited by the movements of the handle or the fan or decoy 400. The gun mount 120 (and the gun 700) may move (preferably by pivoting on a pivot point) even when the handle 110 and the fan or decoy 400 are stationary.

The handle 110 may be moved vertically, horizontally, tilted up or down and/or rotated side-to-side causing a corresponding movement to the gun mount 120 (and possibly the gun mount's 120 pivot point) and the fan or decoy 400. Thus, the fan or decoy 400 may be moved through the use of the handle 110 and fan or decoy support 130 while the gun 700 may be simultaneously moved through the use of the pivoting gun mount 120. The hunting device 100 is thus able to allow the hunter to support the gun 700 in the gun mount 120 with some degrees of freedom of movement for the gun 700 while simultaneously using a fan or decoy 400, such as a turkey fan, to attract game and/or to hide the hunter.

While the invention has generally been described with a hunter using a gun 700, it should be understood that the gun 700 is hereby defined to be a rifle, shotgun, handgun, crossbow and/or bow. Also, while the invention has generally been described with a fan or decoy 400, the fan or decoy 400 could be replaced with another hunting decoy or a particular type of fan from real game or a simulated fan. As an example, the fan or decoy 400 may be, or be made to look like, a turkey fan. To protect the hunter from other hunters, one or more parts of the hunting device 100 may be colored hunter orange. It may be advantageous for some parts of the fan or decoy 400, such as the outer fringes, to be the color hunter orange so that other hunters will not confuse the hunting device 100 with actual wild game.

The invention claimed is:
1. A hunting device, comprising:
   a handle configured to allow a hunter to hold the hunting device with one hand;
   a decoy support, configured to hold a decoy, connected to the handle so that a movement of the handle causes a corresponding movement of the decoy support; and a gun mount comprising a movable joint, wherein the movable joint is connected to the handle to allow the decoy to move in a first direction through the use of the handle while a gun is simultaneously moved in a second direction, different from the first direction, through the use of the gun mount;

wherein the gun mount further comprises a clamp that passes through a side of a halfpipe and configured to fixedly retains the gun stock or the gun barrel in the gun mount.

2. A hunting device, comprising:

a handle configured to allow a hunter to hold the hunting device with one hand;

a fan support connected to the handle configured for receiving, spreading and collapsing a fan; and a gun mount pivotably mounted over and/or adjacent the handle so that the gun mount pivots on a pivot point adjacent the handle to allow the fan to move in a first direction through the use of the handle while a gun is simultaneously moved in a second direction, different from the first direction, through the use of the gun mount;

wherein the gun mount includes a mounting means for receiving and supporting a gun stock or a gun barrel; and wherein the mounting means comprises a clamp that passes through a side of a halfpipe and rigidly retains the gun stock or the gun barrel in the gun mount.

3. A hunting device, comprising:

a handle configured to allow a hunter to hold the hunting device with one hand;

a fan support connected to the handle configured for receiving, spreading and collapsing a fan; and a gun mount pivotably mounted over and/or adjacent the handle so that the gun mount pivots on a pivot point adjacent the handle to allow the fan to move in a first direction through the use of the handle while a gun is simultaneously moved in a second direction, different from the first direction, through the use of the gun mount;

wherein the gun mount includes a mounting means for receiving and supporting a gun stock or a gun barrel; and wherein the mounting means comprises a first clamp that passes through a first side of the halfpipe and a second clamp that passes through a second side of the halfpipe, the first clamp comprises a first gun contact surface and the second clamp comprises a second gun contact surface and the first gun contact surface and the second gun contact surface face each other inside of the halfpipe thereby configured to press against and fixedly retain the gun stock or the gun barrel in the halfpipe.

\* \* \* \* \*